(12) United States Patent
Isozaki (10) Patent No.: US 6,256,119 B1
(45) Date of Patent: Jul. 3, 2001

(54) SHEET TRANSFER DEVICE AND APPARATUS INCORPORATING THE SAME

(75) Inventor: Atsushi Isozaki, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/100,249

(22) Filed: Jun. 19, 1998

(30) Foreign Application Priority Data

Jun. 23, 1997 (JP) .................................................. 9-165781

(51) Int. Cl.$^7$ ...................................................... H04N 1/04
(52) U.S. Cl. ........................ 358/498; 358/488; 271/265.02
(58) Field of Search .................................. 358/498, 496, 358/471, 497, 494, 488, 296; 347/177; 399/405; 271/265.02, 265.03, 259, 3.15, 3.17

(56) References Cited

U.S. PATENT DOCUMENTS

| | | | | |
|---|---|---|---|---|
| 4,667,208 | * | 5/1987 | Shiraki et al. ........................ | 347/177 |
| 5,216,473 | * | 6/1993 | Maeyama ............................... | 399/364 |
| 5,580,046 | * | 12/1996 | Beaufort et al. ...................... | 271/3.16 |

FOREIGN PATENT DOCUMENTS

| | | |
|---|---|---|
| 63-165250 | 7/1988 | (JP) . |
| 1-296765 | 11/1989 | (JP) . |

* cited by examiner

Primary Examiner—Cheukfan Lee
(74) Attorney, Agent, or Firm—Oliff & Berridge, PLC (57) ABSTRACT

A sheet transfer device is provided for transferring a sheet member along a transfer path having an upstream point and a downstream point. The sheet transfer includes a transfer mechanism for moving the sheet member along the transfer path from the upstream point to the downstream point, an upstream sensor arranged closer to the upstream point than to the downstream point for detecting presence and absence of the sheet member and a downstream sensor arranged closer to the downstream point than to the upstream point for detecting presence and absence of the sheet member. The transfer mechanism is arranged to discharge the sheet member only after the downstream sensor detects the presence of the sheet member and the upstream sensor detects the absence of the sheet member.

20 Claims, 5 Drawing Sheets

SHEET TRANSFER DEVICE AND APPARATUS INCORPORATING THE SAME

BACKGROUND OF THE INVENTION

1. Field of the Invention

This invention relates to a sheet transfer device used for transferring sheet materials such as recording paper sheets and image-carrying paper sheets. In particular, the present invention relates to a sheet transfer device provided with sensors for monitoring the transfer condition of the sheet materials.

2. Description of the Related Art

Figure 5A:
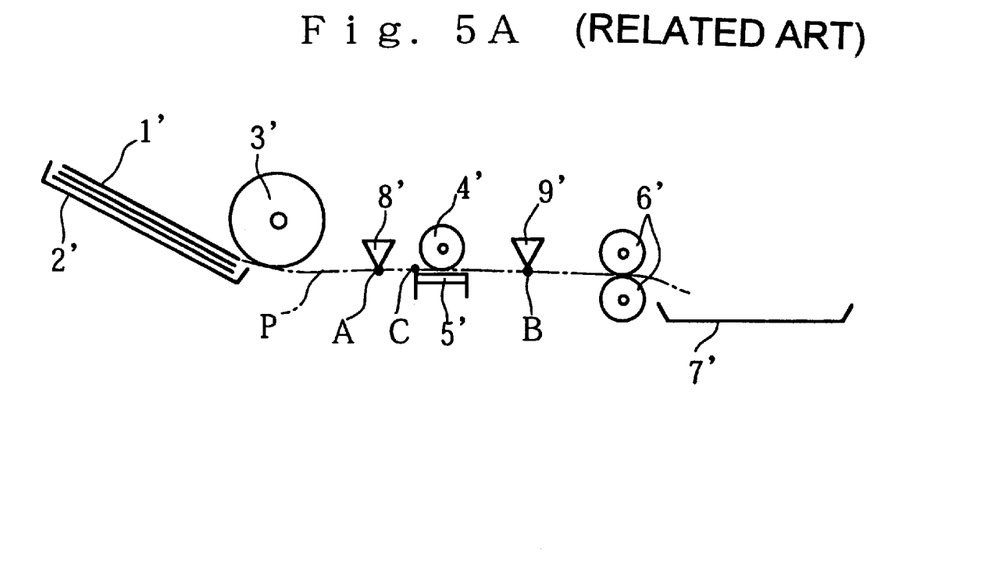
FIGS. 5A and 5B illustrate a conventional sheet transfer device and its operational disadvantage.

Sheet transfer devices are widely used in various electrical appliances, such as printers, facsimile machines and the like. Referring to FIG. 5A, a conventional sheet transfer device incorporated in a printer for example, may include a paper feed tray 2' for holding recording paper sheets 1', a feed roller 3' disposed adjacent to the paper feed tray 2', a platen roller 4' arranged in facing relation to a printhead 5' of the printer, discharge rollers 6' and a discharged paper tray 7'.

Between the paper feed tray 2' and the discharged paper tray 7' extends a paper transfer path P along which the recording paper sheet 1' is transferred when the above-mentioned rollers 3'–6' are rotated.

The conventional sheet transfer device is also provided with sensors 8'–9' for monitoring the transfer procedure of the recording paper sheet 1'. These sensors are disposed at two locations along the sheet transfer path P: at an upstream position A between the feed roller 3' and the platen roller 4', and at a downstream position B between the platen roller 4' and the discharge rollers 6'. Typically, these sensors may be mechanical devices which are arranged to generate presence signals or absence signals, depending on whether the sensors 8'–9' are held in contact with the recording paper sheet 1' or not.

The sheet transfer device having the above arrangement operates as follows. Upon actuation of the feed roller 3', a recording paper sheet 1' is pulled out of the paper feed tray 2' and moved along the transfer path P toward the printhead 5' of the printer. On its way, when the front end portion of the recording paper sheet 1' comes into contact with the upstream sensor 8', the upstream sensor generate presence signals, as previously stated. These signals are sent to a CPU (central processing unit) of the printer. Receiving the signals, the CPU begins to control the rotation of the feed roller 3' so that the front edge of the recording paper sheet 1' is properly brought to a position C between the platen roller 4' and the printhead 5'. (The operation described here is called "the paper feeding step" below.)

When the paper feeding step is finished, the printhead 5' starts printing on the recording paper sheet 1'. While the printing is performed, the recording paper sheet 1' is fed stepwise in a known manner. (The operation here is called "the printing step" below.)

When the printing step proceeds smoothly (without having the recording paper sheet 1' crumpled, for example), the front edge of the recording paper sheet 1' is brought into contact with the downstream sensor 9'. Then, the downstream sensor 9' sends presence signals to the CPU. Upon receiving the signals, the CPU determines that the sheet transfer operation is being properly performed.

Finally, when the printing step comes to an end and the rear end portion of the recording paper sheet 1' leaves the upstream sensor 8', the upstream sensor sends absence signals to the CPU. At this instant, the CPU changes the transfer mode for the recording paper sheet 1' from the currently-performed stepwise motion to a continuous discharging motion, so that the recording paper sheet 1' is swiftly sent to the discharged paper tray 7'.

The conventional sheet transfer device, however, has been found to have the following disadvantage.

Figure 5B:
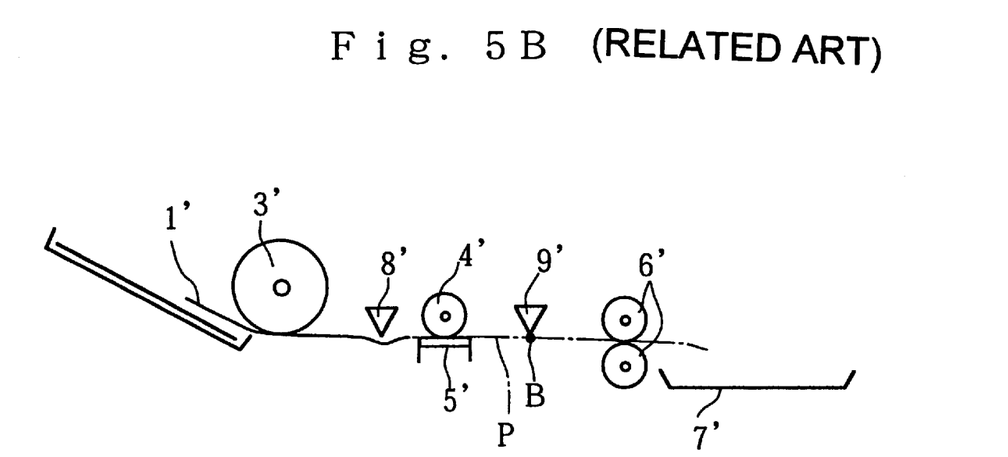

As shown in FIG. 5B, the front end portion of the recording paper sheet 1' is not held between the platen roller 4' and the printhead 5' during the paper feeding step described above. In this state, the recording paper sheet 1' may unduly sag or prematurely leave the upstream sensor 8'. As a result, the absence signals are sent to the CPU of the printer, whereby the CPU, determining that the rear end portion of the recording paper sheet 1' left the upstream sensor 8', erroneously changes the transfer mode for the recording paper sheet 1' to the continuous discharging motion.

SUMMARY OF THE INVENTION

It is, therefore, an object of the present invention is to provide a sheet transfer device capable of overcoming the disadvantage described above.

Another object of the present invention is to provide a printer and a facsimile machine which incorporate such a sheet transfer device.

According to a first aspect of the present invention, there is provided a sheet transfer device for transferring a sheet member along a transfer path having an upstream point and a downstream point, the sheet transfer device comprising:

a transfer mechanism for moving the sheet member along the transfer path from the upstream point to the downstream point;

at least one upstream sensor arranged closer to the upstream point than to the downstream point for detecting presence and absence of the sheet member; and at least one downstream sensor arranged closer to the downstream point than to the upstream point for detecting presence and absence of the sheet member;

wherein the transfer mechanism is arranged to discharge the sheet member only after the downstream sensor detects the presence of the sheet member and the upstream sensor detects the absence of the sheet member.

With such an arrangement, it is possible to prevent the sheet member from being prematurely discharged from a transfer system of the transfer device. Thus, unlike in the conventional sheet transfer device, the sheet member and elements of the transfer system are advantageously protected from damage which would otherwise be caused by improper discharging of the recording paper.

According to a preferred embodiment, the transfer mechanism includes a feed roller arranged between the upstream point and the upstream sensor, an intermediate roller arranged between the upstream sensor and the downstream sensor, and a discharge roller arranged between the downstream sensor and the downstream point.

The upstream sensor and the downstream sensor may be mechanical sensing devices which produce presence signals when the mechanical sensing devices are held in contact with the sheet member, and absence signals when the mechanical sensing devices are held out of contact with the sheet member.

The mechanical sensing device may include a plate member pivotable about an axis upon contact of the sheet member.

The sheet transfer device may further comprise a controller for controlling the transfer mechanism based on the presence signals and absence signals from the upstream sensor and the downstream sensor. Such a controller may be provided by a CPU.

According to a second aspect of the present invention, there is provided a printer for printing on a sheet member transferred along a transfer path having an upstream point and a downstream point, the printer comprising:

a transfer mechanism for moving the sheet member along the transfer path from the upstream point to the downstream point;

at least one upstream sensor arranged closer to the upstream point than to the downstream point for detecting presence and absence of the sheet member;

at least one downstream sensor arranged closer to the downstream point than to the upstream point for detecting presence and absence of the sheet member; and a printhead arranged between the upstream sensor and the downstream sensor;

wherein the transfer mechanism is arranged to discharge the sheet member only after the downstream sensor detects the presence of the sheet member and the upstream sensor detects the absence of the sheet member.

According to a third aspect of the present invention, there is provided a facsimile machine comprising:

a transfer mechanism for transferring a sheet member along a transfer path from an upstream point to a downstream point of the transfer path;

at least one upstream sensor arranged closer to the upstream point than to the downstream point for detecting presence and absence of the sheet member;

at least one downstream sensor arranged closer to the downstream point than to the upstream point for detecting presence and absence of the sheet member; and an operation member arranged between the upstream sensor and the downstream sensor;

wherein the transfer mechanism is arranged to discharge the sheet member only after the downstream sensor detects the presence of the sheet member and the upstream sensor detects the absence of the sheet member.

The operation member may comprise a printhead or an image reader, depending on the applications.

Other objects, features and advantages of the present invention will be apparent from the detailed description of the embodiment given below with reference to the accompanying drawings.

DETAILED DESCRIPTION OF THE PREFERRED EMBODIMENT

The preferred embodiment of the present invention will be described below with reference to the accompanying drawings.

Figure 1:
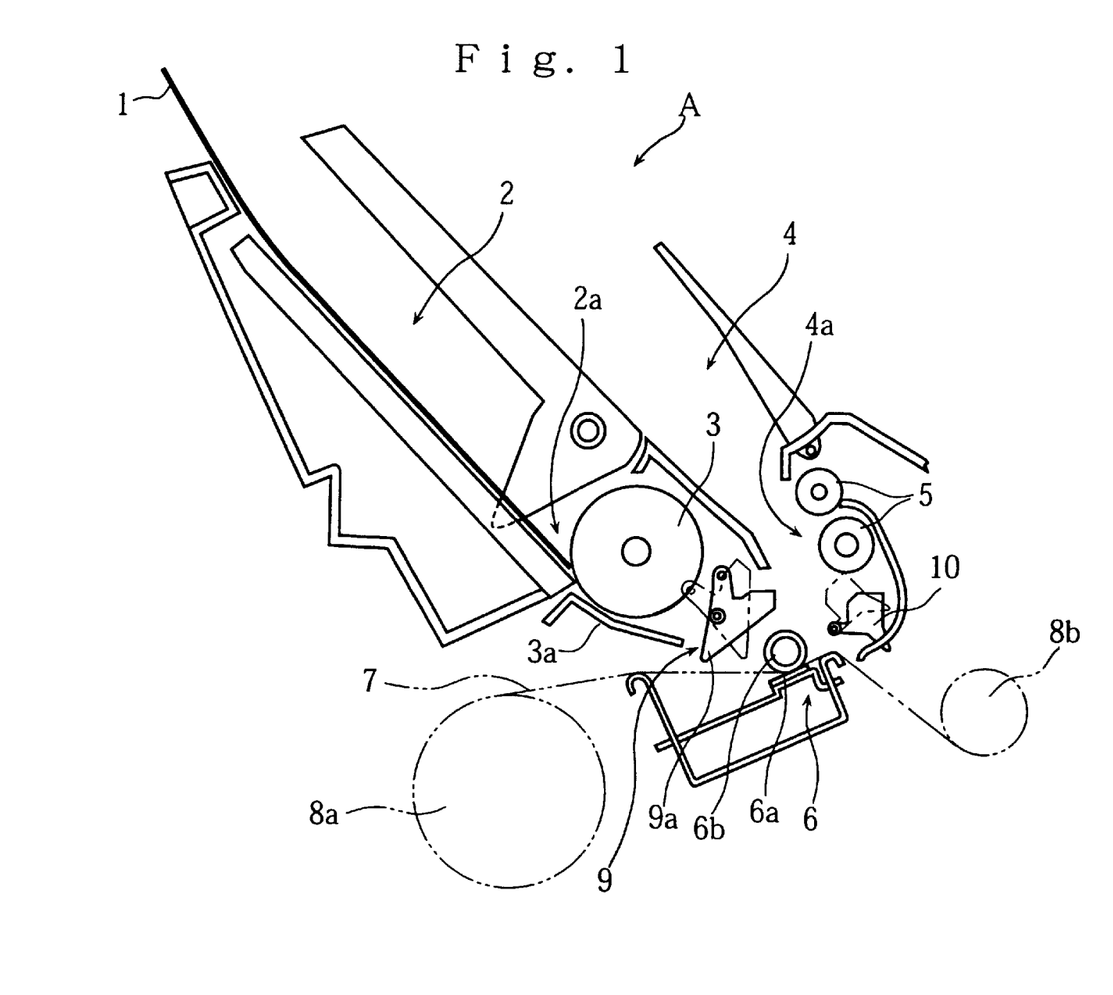
FIG. 1 is a sectional side view showing a sheet transfer device incorporated in a facsimile machine embodying the present invention.

Reference is first made to FIG. 1 which is a sectional side view showing a sheet transfer device (generally designated by reference A) embodying the present invention. In the illustrated embodiment, it is assumed that the sheet transfer device A is incorporated in a recording section 32 (see FIG. 2) of a facsimile machine. However, this arrangement is not limitative, and the sheet transfer device A of the present invention may be incorporated in a reading section 32 of the facsimile machine, or even in other electrical apparatus such as printers, photocopiers and the like.

As shown in FIG. 1, the sheet transfer device A includes a paper feed section 2 for holding recording paper sheets 1, a feed roller 3 for pulling the recording paper sheets 1 from the paper feed section 2, and a pair of discharge rollers 5 for discharging the recording paper sheet 1 into a discharge section 4.

The recording paper sheet 1 comes into engagement with the feed roller 3 at a feed point 2a, while it comes out of engagement with the discharge rollers 5 at a discharge point 4a. Though not shown, a predetermined sheet transfer path along which the recording paper sheet 1 is moved extends from the feed point 2a to the discharge point 4a.

The feed roller 3 is rotated by a stepping motor (not shown) whose operation is controlled by a control system (described later) of the facsimile machine. A guide plate 3a is arranged adjacent to the feed roller 3, so that the recording paper sheet 1 is transferred between the feed roller 3 and the guide plate 3a.

The discharge rollers 5 are also driven by stepping motors (not shown) under the control of the above-mentioned control system. In operation, the recording paper sheet 1 is inserted between the discharge rollers 5 to be discharged into the discharge section 4.

The illustrated facsimile machine has a printing unit 6 provided with a printhead 6a for performing printing on the recording paper sheet. As can be seen, the printhead 6a is arranged at an intermediate position along the sheet transfer path. Adjacent to the printhead 6a, a platen roller 6b is provided in facing relation to the printhead. The platen roller 6b is also rotated by a stepping motor (not shown) under the control of the control system of the facsimile machine.

Ink ribbon 7 extends between the printhead 6a and the platen roller 6b. As is shown, the ink ribbon 7 is supplied from a ribbon feed roller 8a and wound around another roller 8b.

The sheet transfer device A also includes a plurality of sensors 9 (only one shown) and a plurality of sensors 10 (only one shown) for detecting the presence or absence of the recording paper sheet transferred along the sheet transfer path. The first or upstream sensors 9 are arranged between the feed roller 3 and the platen roller 6b, while the second or downstream sensors 10 are arranged between the platen roller 6b and the discharge rollers 5.

The upstream sensor 9 is a mechanical sensing device including a contact plate 9a pivotable about a horizontal axis. In FIG. 1, the initial position of the contact plate 9a is shown in solid lines. In the initial position, the first sensor 9 sends absence signals to a CPU (central processing unit) which is provided in the control system of the facsimile machine.

When the recording paper sheet 1 comes into contact with the contact plate 9a of the first sensor 9, the contact plate 9a is rotated to take a position shown in double-dot chain lines. In this position, the first sensor 9 sends presence signals to the above-mentioned CPU. Thereafter, when the recording paper sheet 1 leaves the first sensor 9, the contact plate 9a will return to the initial position. Thereafter, the first sensor 9 sends absence signals to the CPU.

The second sensor 10 is basically similar to the first sensor 9. Namely, the second sensor 10 is a mechanical sensing device including a contact plate pivotable about a horizontal axis. When the second sensor 10 is in the initial position shown in solid lines, the sensor 10 sends absence signals to the CPU. When the second sensor 10 is held in a position shown in double-dot chain lines, it sends presence signals to the CPU.

Figure 2:
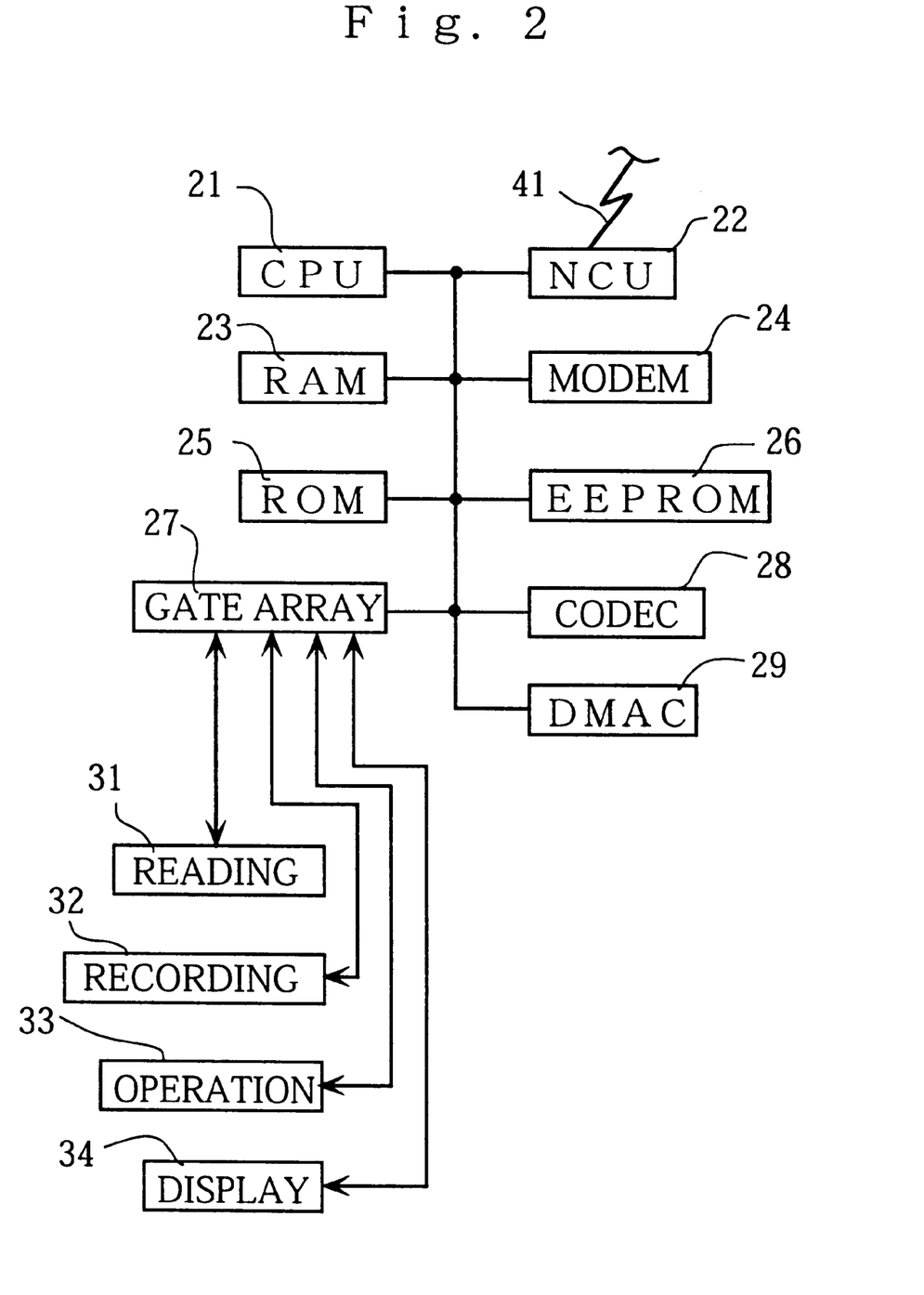
FIG. 2 is a circuit block diagram of a control system of the facsimile machine shown in FIG. 1.

Reference is now made to FIG. 2 which is a circuit block diagram showing the control system of the facsimile machine. In addition to the already-mentioned CPU (reference number 21), the control system includes an NCU (network control unit) 22, a RAM (random access memory) 23, a modem (modulator-demodulator) 24, a ROM (read-only memory) 25, an EEPROM (electrically erasable and programmable ROM) 26, a gate array 27, a codec (coder-decoder) 28, and a DMAC (direct memory access controller) 29.

Further, the control system also comprises a reading section 31, a recording section 32, an operation section 33, and a display section 34.

The CPU 21, the NCU 22, the RAM 23, the modem 24, the ROM 25, the EEPROM 26, the gate array 27, the codec 28 and the DMAC 29 are connected to each other via bus lines. The bus lines include data bus lines, address bus lines and control signal bus lines. The gate array 27 is connected to the reading section 31, the recording section 32, the operation section 33 and the display section 34, respectively. The NCU 22 is connected to a telephone line 41.

The CPU 21 provides an overall control of the facsimile machine. As will be described in detail hereinafter, the CPU 21 includes a transfer controller 21a (see FIG. 3) for controlling the operation of the feed roller 3, platen roller 6b and discharge rollers 5.

The NCU 22 is connected to the telephone line 41 for providing network control. The NCU 22 is also connected to the modem 24. The modem 24 modulates the transmitting codes and demodulates the received codes.

The RAM 23 stores various data such as image data for example. Of course, an additional RAM or RAMs may be provided to increase the capacity of data storage.

The ROM 25 stores various programs, initial value data or the like as required for controlling the facsimile machine, whereas the EEPROM 26 stores registered data (e.g. short-cut dials) and/or various flags.

The gate array 27 functions as an I/O interface (input/output interface) for the CPU 21 for data transmission to and/or from the reading section 31, the recording section 32, the operation section 33 and the display section 34. The gate array 27 also performs various kinds of processing for e.g., image signals from the reading section 31.

The codec 28 performs coding of the transmitting image data and decoding of the received image data, for example.

The DMAC 29 provides memory access control with respect to the RAM 23 for example.

The reading section 31 includes an image reading apparatus for reading out images on an image carrying paper sheet (not shown) and supplying image signals corresponding to the images.

The recording section 32 performs printing of images on a recording paper sheet (not shown) on the basis of the image data received through the gate array 27. The sheet transfer device A shown in FIG. 1 is arranged in the recording section 32. However, as can be easily seen, an additional sheet transfer device according to the present invention may be provided in the reading section 31 as well.

The operation section 33 has key switches to be operated by the user for output of operation signals, whereas the display section 34 includes an LCD (liquid crystal display) or the like for providing various indications under the control of the CPU 21.

Figure 3:
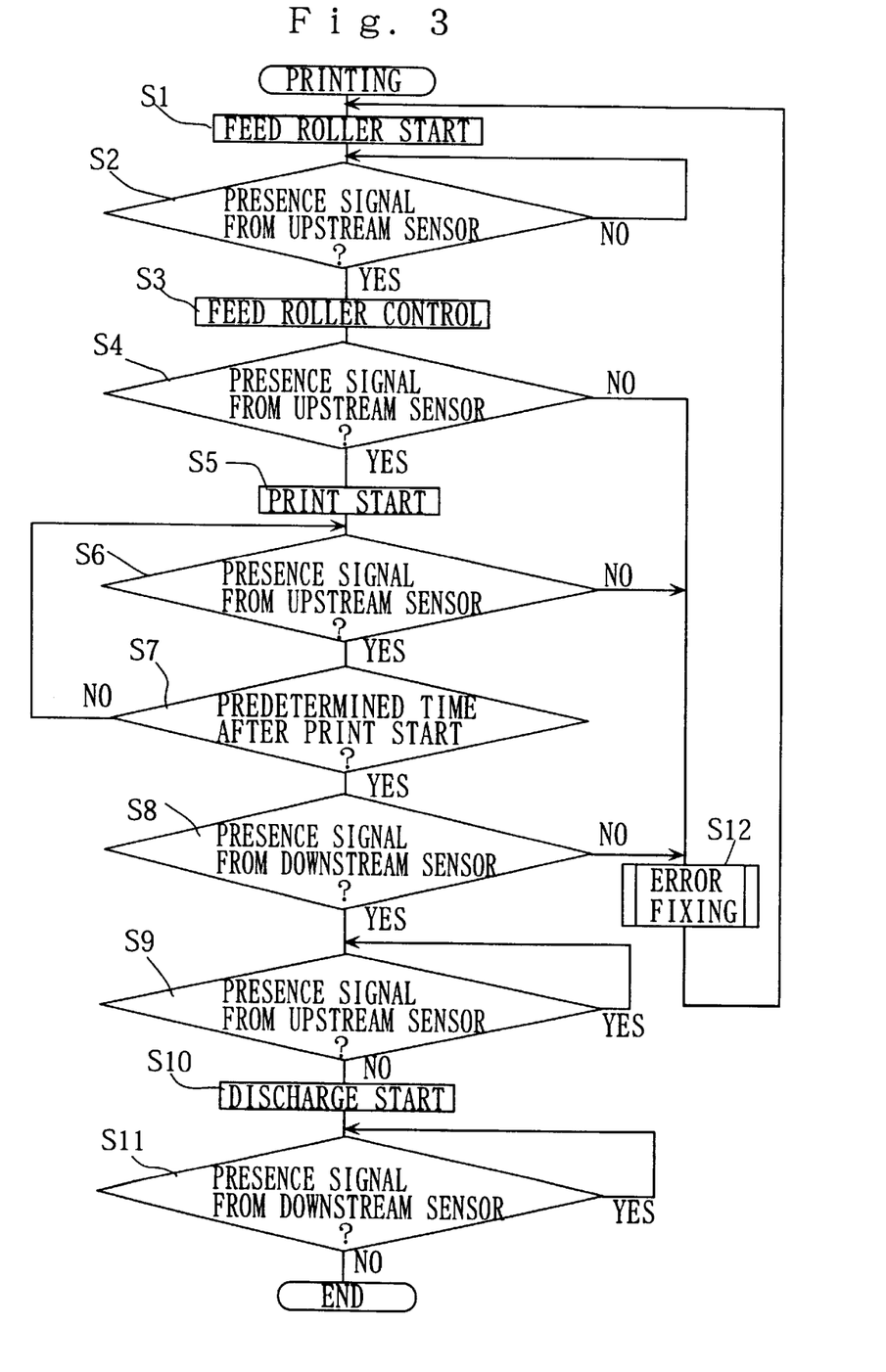
FIG. 3 is a flow chart illustrating a printing procedure of the facsimile machine.
Figure 4:
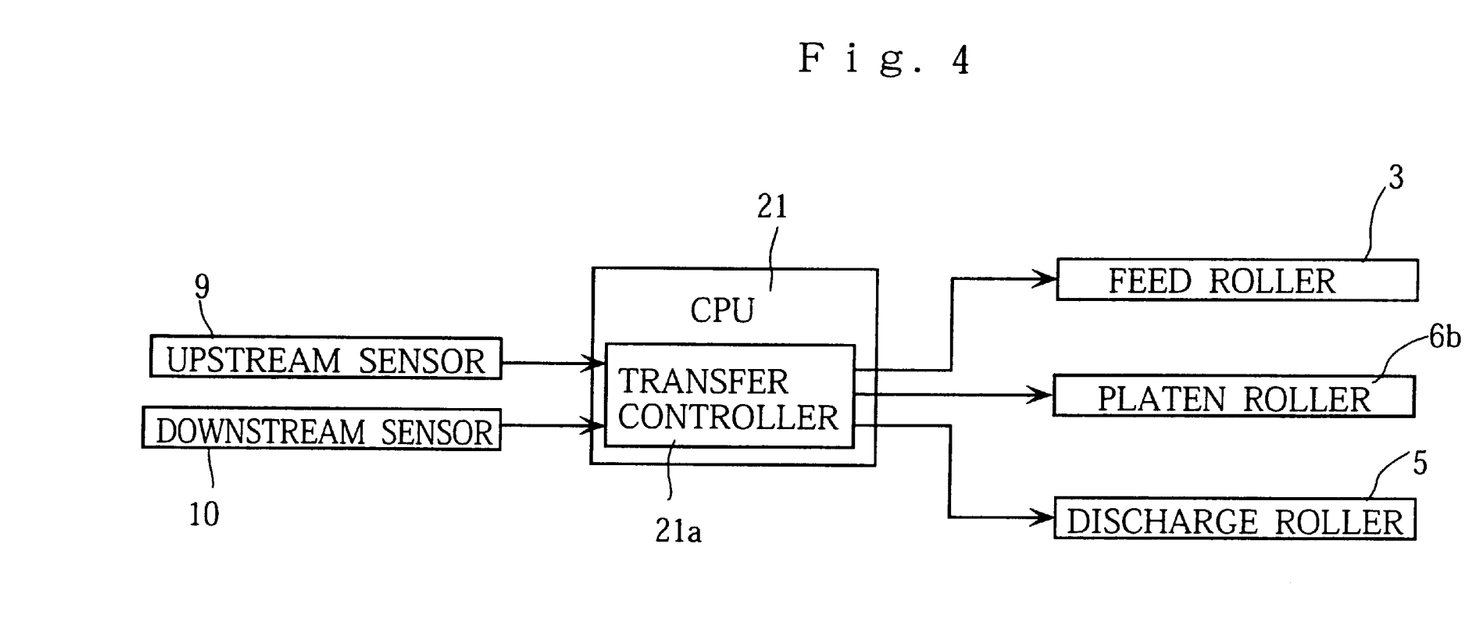
FIG. 4 schematically shows a CPU of the facsimile machine cooperating with sensors and rollers used in the sheet transfer device of FIG. 1.

Referring to FIGS. 3 and 4, description will now be made to the function of the sheet transfer device A. First, in order to start a printing procedure, the CPU 21 sends driving signals to the stepping motor associated with the feed roller 3. As a result, the feed roller 3 begins to rotate (S1 in FIG. 3) to shift a recording paper sheet 1 from the paper feed section 2 toward the upstream sensor 9.

Once the printing operation is started, the transfer controller 21a of the CPU 21 determines whether the upstream sensor 9 is sending presence signals or absence signals (S2). When presence signals are received (S2:YES), the transfer controller 21a of the CPU 21 controls the rotation of the feed roller 3 so that the roller 3 is rotated through an angle sufficient enough to bring the front edge of the recording paper sheet 1 to a position between the platen roller 6b and the printhead 6a (S3).

During the above procedure (hereinafter referred to as "the paper feeding step"), the transfer controller 21a of the CPU is monitoring whether the upstream sensor 9 is still sending presence signals, or, instead, absence signals (S4). If is is presence signals (S4:YES) that the CPU 21 receives, the paper feeding step is continued.

If it is absence signals (S4:NO), which means that the recording paper sheet prematurely left the upstream sensor 9, the procedure goes to an error-fixing step (S12). Then, under the control of the CPU 21, necessary measures are taken, such as stopping the rotation of the feed roller 3 while informing the user of the error by turning on an error indicator, for example.

With such an arrangement, it is possible to prevent the recording paper sheet 1 from being unduly discharged even when the paper sheet 1 is prematurely detached from the upstream sensor 9.

When YES in S4 (namely, the paper feeding step is properly finished), the printhead 6a starts printing on the recording paper sheet 1 (S5). During this procedure (hereinafter referred to as "the printing step"), the feed roller 3 and the platen roller 6b are rotated stepwise under the control of the transfer controller 21a of the CPU 21.

After the printing step begins, the transfer controller 21a of the CPU is monitoring whether the upstream sensor 9 is still sending presence signals, or absence signals instead (S6). If is is presence signals (S6:YES) that the CPU 21 receives, the printing step is continued.

If it is absence signals (S6:NO), which means that the recording paper sheet prematurely left the upstream sensor 9, the procedure goes to the error-fixing step (S12). Then, under the control of the CPU 21, necessary measures are taken, such as stopping the rotation of the feed roller 3 while informing the user of the error by turning on an error indicator, as stated previously.

During the printing step, the CPU 21 monitors if a predetermined time has passed or not (S7). Here, the predetermined time is defined as a time which is taken for the front edge of the recording paper sheet to contact with the downstream sensor 10 after the front edge leaves the platen roller 6b. When NO in S7, the procedure returns to S6.

When YES in S7, the transfer controller 21a of the CPU 21 determines whether the downstream sensor 10 is sending presence signals, or absence signals instead (S8). If is is presence signals (S8:YES), which means that the front edge of the recording paper sheet 1 properly came into contact with the downstream sensor 10 in the predetermined time, the printing step is continued.

If it is absence signals (S8:NO), which means that the recording paper sheet 1 failed to reach the downstream sensor 10 in the predetermined time, the procedure is subjected to the error-fixing step (S12).

When YES in S8, the transfer controller 21a of the CPU 21 monitors whether the upstream sensor 9 is still sending presence signals, or absence signals instead. If it is presence signals (S9:YES) that are received, the transfer controller 21a continues the monitoring.

If it is absence signals (S9:NO), a discharging step is started (S10) for sending the recording paper sheet to the discharge section 4.

Finally, the transfer controller 21a of the CPU 21 monitors whether the downstream sensor 10 is sending presence signals or absence signals (S11). If it is presence signals (S11:YES), the transfer controller 21a continues the monitoring. If it is absence signals (S11:NO), the entire printing procedures end.

As described above, according to the present invention, it is possible to prevent the recording paper sheet from being prematurely discharged from the transfer system of the printer. Thus, unlike in the conventional sheet transfer device, the recording paper sheet and elements of the transfer system are advantageously protected from damage which would otherwise be caused by improper discharging of the recording paper.

As previously mentioned, the sheet transfer device of the present invention may be incorporated in the reading section 32 of the facsimile machine. In that case, the printhead 6a shown in FIG. 1 may be replaced with an image reader.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. A sheet transfer device for transferring a sheet member along a transfer path having an upstream point and a downstream point, the sheet transfer device comprising:

a transfer mechanism for moving the sheet member along the transfer path from the upstream point to the downstream point;

at least one upstream sensor arranged closer to the upstream point than to the downstream point for detecting presence and absence of the sheet member; and at least one downstream sensor arranged closer to the downstream point than to the upstream point for detecting presence and absence of the sheet member, the downstream sensor being spaced from the upstream sensor by a predetermined distance measured along the transfer path, the predetermined distance being shorter than a length of the sheet member;

wherein the transfer mechanism does not discharge the sheet member until the downstream sensor detects the presence of the sheet member, even if the upstream sensor detects the presence and then the absence of the sheet member.

2. The sheet transfer device according to claim 1, wherein the transfer mechanism includes a feed roller arranged between the upstream point and the upstream sensor, an intermediate roller arranged between the upstream sensor and the downstream sensor, and a discharge roller arranged between the downstream sensor and the downstream point.

3. The sheet transfer device according to claim 1, wherein the upstream sensor and the downstream sensor are mechanical sensing devices which produce presence signals when the mechanical sensing devices are held in contact with the sheet member, and absence signals when the mechanical sensing devices are held out of contact with the sheet member.

4. The sheet transfer device according to claim 3, wherein the mechanical sensing device includes a plate member pivotable about an axis upon contact of the sheet member.

5. The sheet transfer device according to claim 3, further comprising a controller for controlling the transfer mechanism based on the presence signals and absence signals from the upstream sensor and the downstream sensor.

6. The sheet transfer device according to claim 5, wherein the controller subjects the transfer mechanism to an error-fixing mode when the controller receives absence signals from the upstream sensor while receiving absence signals from the downstream sensor, after the upstream sensor detects the presence of the sheet member.

7. The sheet transfer device according to claim 5, wherein the controller is provided by a CPU.

8. A printer for printing on a sheet member transferred along a transfer path having an upstream point and a downstream point, the printer comprising:

a transfer mechanism for moving the sheet member along the transfer path from the upstream point to the downstream point;

at least one upstream sensor arranged closer to the upstream point than to the downstream point for detecting presence and absence of the sheet member;

at least one downstream sensor arranged closer to the downstream point than to the upstream point for detecting presence and absence of the sheet member, the downstream sensor being spaced from the upstream sensor by a predetermined distance measured along the transfer path, the predetermined distance being shorter than a length of the sheet member; and a printhead arranged between the upstream sensor and the downstream sensor;

wherein the transfer mechanism does not discharge the sheet member until the downstream sensor detects the presence of the sheet member, even if the upstream sensor detects the presence and then the absence of the sheet member.

9. The printer according to claim 8, wherein the transfer mechanism includes a feed roller arranged between the upstream point and the upstream sensor, an intermediate roller arranged in facing relation to the printhead, and a discharge roller arranged between the downstream sensor and the downstream point.

10. The printer according to claim 8, wherein the upstream sensor and the downstream sensor are mechanical sensing devices which produce presence signals when the mechanical sensing devices are held in contact with the sheet member, and absence signals when the mechanical sensing devices are held out of contact with the sheet member.

11. The printer according to claim 10, further comprising a controller for controlling the transfer mechanism based on the presence signals and absence signals from the upstream sensor and the downstream sensor.

12. The printer according to claim 11, wherein the controller subjects the transfer mechanism to an error-fixing mode when the controller receives absence signals from the upstream sensor while receiving absence signals from the downstream sensor, after the upstream sensor detects the presence of the sheet member.

13. The printer according to claim 11, wherein the controller is provided by a CPU.

14. A facsimile machine, comprising:
   a transfer mechanism for transferring a sheet member along a transfer path from an upstream point to a downstream point of the transfer path;
   at least one upstream sensor arranged closer to the upstream point than to the downstream point for detecting the presence and absence of the sheet member;
   at least one downstream sensor arranged closer to the downstream point than to the upstream point for detecting the presence and absence of the sheet member, the downstream sensor being spaced from the upstream sensor by a predetermined distance measured along the transfer path, the predetermined distance being shorter than a length of the sheet member; and
   an operation member arranged between the upstream sensor and the downstream sensor;
   wherein the transfer mechanism does not discharge the sheet member until the downstream sensor detects then the presence of the sheet member, even if the upstream sensor detects the presence and then the absence of the sheet member.

15. The facsimile machine according to claim 14, wherein the operation member comprises a printhead.

16. The facsimile machine according to claim 14, wherein the operation member comprises an image reader.

17. A sheet transfer device for transferring a sheet member along a transfer path having an upstream point and a downstream point, the sheet transfer device comprising:
   a transfer mechanism for moving the sheet member along the transfer path from the upstream point to the downstream point;
   at least one upstream sensor arranged closer to the upstream point than to the downstream point for detecting presence and absence of the sheet member;
   at least one downstream sensor arranged closer to the downstream point than to the upstream point for detecting the presence and absence of the sheet member; and
   a transfer condition monitor arranged to monitor a sheet transfer condition based on a signal from the upstream sensor, wherein the upstream sensor starts to detect the absence of the sheet member only after the downstream sensor detects the presence of the sheet member.

18. The sheet transfer device according to claim 17, wherein the transfer mechanism is arranged to discharge the sheet member only after the downstream sensor detects the presence of the sheet member and the upstream sensor detects the absence of the sheet member.

19. The sheet transfer device according to claim 17, wherein the transfer mechanism does not discharge the sheet member until the downstream sensor detects the presence of the sheet member, even if the upstream sensor detects the presence and then the absence of the sheet member.

20. The sheet transfer device according to claim 17, further comprising a controller for controlling the transfer mechanism based on a presence signal and an absence signal from the upstream sensor and the downstream sensor, wherein the controller subjects the transfer mechanism to an error-fixing mode when the controller receives an absence signal from the upstream sensor while receiving an absence signal from the downstream sensor, after the upstream sensor detects the presence of the sheet member.

* * * * *